(12) United States Patent
Takakura et al.

(10) Patent No.: US 11,491,927 B2
(45) Date of Patent: Nov. 8, 2022

(54) WIRE HARNESS SUPPORT MEMBER, SUPPORT MEMBER-ATTACHED WIRE HARNESS, AND SUPPORT STRUCTURE FOR SUPPORT MEMBER-ATTACHED WIRE HARNESS

(71) Applicant: Sumitomo Wiring Systems, Ltd., Mie (JP)

(72) Inventors: Ryuta Takakura, Mie (JP); Motohiro Yokoi, Mie (JP); Daisuke Ebata, Mie (JP); Shigeki Ikeda, Mie (JP); Tetsuya Nishimura, Mie (JP); Haruka Nakano, Mie (JP); Kenta Arai, Mie (JP); Takayuki Suzuki, Mie (JP); Satoshi Ujita, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/761,970

(22) PCT Filed: Aug. 21, 2018

(86) PCT No.: PCT/JP2018/030761
§ 371 (c)(1),
(2) Date: May 6, 2020

(87) PCT Pub. No.: WO2019/097792
PCT Pub. Date: May 23, 2019

(65) Prior Publication Data
US 2021/0188199 A1   Jun. 24, 2021

(30) Foreign Application Priority Data

Nov. 17, 2017   (JP) .............................. JP2017-221793

(51) Int. Cl.
*B60R 16/02* (2006.01)
*H02G 3/00* (2006.01)
*H02G 3/30* (2006.01)

(52) U.S. Cl.
CPC ......... *B60R 16/0215* (2013.01); *H02G 3/263* (2013.01); *H02G 3/30* (2013.01)

(58) Field of Classification Search
CPC combination set(s) only.
See application file for complete search history.

(56) References Cited

U.S. PATENT DOCUMENTS 5,320,312 A * 6/1994 Hoenninger ............ F16L 3/227
211/107
5,703,330 A * 12/1997 Kujawski ............ B60R 16/0215
138/157

(Continued)

FOREIGN PATENT DOCUMENTS

CN   107323374 A   11/2017
JP   55-74220 A    5/1980

(Continued)

OTHER PUBLICATIONS

China Official Action issued in CN Application No. 201880070693.8, dated Nov. 4, 2020 and English language translation thereof.

(Continued)

*Primary Examiner* — Paresh Paghadal
(74) *Attorney, Agent, or Firm* — Greenblum & Bernstein, P.L.C.

(57) ABSTRACT

A wire harness support member supports a wire harness including a plurality of electrical wires on an attaching target member. The wire harness support member includes: a base attached to the attaching target member while surrounding at least a part of a periphery of the attaching target member; and at least one electrical wire holding member which can be position-adjustably fixed to the base around the attaching (Continued)

target member while holding at least some of the plurality of electrical wires.

6 Claims, 9 Drawing Sheets

(56) References Cited

U.S. PATENT DOCUMENTS

| | | | | |
|---|---|---|---|---|
| 6,116,810 | A * | 9/2000 | Eberle | F16B 2/10 248/68.1 |
| 6,268,566 | B1 * | 7/2001 | Takiguchi | B60R 16/0215 174/72 A |
| 6,380,488 | B1 * | 4/2002 | Takeda | B60R 16/0215 174/135 |
| 6,641,093 | B2 * | 11/2003 | Coudrais | F16L 3/2431 248/73 |
| 7,518,058 | B1 * | 4/2009 | Hagbrandt | H02G 3/02 174/113 C |
| 8,033,511 | B2 * | 10/2011 | Grivas | F24F 1/0003 248/58 |
| 9,358,937 | B2 * | 6/2016 | Matsuda | B60R 16/0215 |
| 9,599,132 | B2 * | 3/2017 | Wyndon | F16B 1/00 |
| 2009/0095505 | A1 * | 4/2009 | Hagbrandt | H02G 3/32 174/136 |
| 2009/0272856 | A1 * | 11/2009 | Azuma | F16L 3/243 248/73 |
| 2012/0220153 | A1 | 8/2012 | Okabe et al. | |
| 2015/0343968 | A1 | 12/2015 | Nagayasu | |
| 2016/0156165 | A1 | 6/2016 | Katou et al. | |
| 2018/0269667 | A1 * | 9/2018 | Schaefer | H02G 3/0456 |
| 2019/0178418 | A1 * | 6/2019 | Jones | H02G 3/0456 |
| 2019/0214803 | A1 * | 7/2019 | Varale | H02G 3/34 |
| 2019/0237950 | A1 * | 8/2019 | Schroder | H02G 3/32 |
| 2019/0293103 | A1 * | 9/2019 | Isaji | F16B 7/048 |

FOREIGN PATENT DOCUMENTS

| | | |
|---|---|---|
| JP | 2000-324663 A | 11/2000 |
| JP | 2014-11837 A | 1/2014 |
| JP | 2015-154568 A | 8/2015 |
| KR | 10-2012-0072385 A | 7/2012 |

OTHER PUBLICATIONS

Indian Official Action issued in Indian Application No. 202017018138, dated Nov. 27, 2020.
Japan Official Action issued in JP Application No. 2017-221793, dated Sep. 8, 2020, and English language translation.
International Search Report issued in PCT/JP2018/030761, dated Oct. 23, 2018.
International Preliminary Report on Patentability issued in PCT/JP2018/030761, dated May 28, 2020.
China Office Action issued in CN Application No. 201880070693.8, dated Aug. 12, 2021 and English language translation thereof.

* cited by examiner

WIRE HARNESS SUPPORT MEMBER, SUPPORT MEMBER-ATTACHED WIRE HARNESS, AND SUPPORT STRUCTURE FOR SUPPORT MEMBER-ATTACHED WIRE HARNESS

TECHNICAL FIELD

The present invention relates to a technique of supporting a wire harness around an attaching target member.

BACKGROUND ART

Patent Document 1 discloses a wire harness support member including: a fitting part capable of fitting in an the outer peripheral part of a rod-like peripheral component and formed into a partially-cylindrical shape which opens at a circumferential part; and protection parts, each of which is formed into a shape that covers the outer peripheral part of a wire harness and is integrally formed with the fitting part in such a manner that the wire harness extends along the rod-like peripheral component.

PRIOR ART DOCUMENTS

Patent Documents

Patent Document 1: Japanese Patent Application Laid-Open No, 2014-11837

SUMMARY

Problem to be Solved by the Invention

Assuming that the wire harness is attached to an attaching target member in a vehicle, an interior cover and various devices may be located around the attaching target member.

There is a possibility that the wire harness interferes with a peripheral component of the attaching target member in a configuration of supporting the wire harness in a predetermined position on the attaching target member.

An object of the present invention is to provide a technique capable of supporting a wire harness in a relatively free position on an attaching target member.

Means to Solve the Problem

In order to solve the above problem, a first aspect is a wire harness support member to support a wire harness including a plurality of electrical wires on an attaching target member, and includes: a base attached to the attaching target member while surrounding at least a part of a periphery of the attaching target member; and at least one electrical wire hold member which can be position-adjustably fixed to the base around the attaching target member while holding at least some of the plurality of electrical wires.

A second aspect is the wire harness support member according to the first aspect, wherein the at least one electrical wire hold member includes an electrical wire bundle hold part to hold an electrical wire bundle that is a bundle of at least some of the plurality of electrical wires.

A third aspect is the wire harness support member according to the first or second aspect, wherein the base includes at least one slide guide, and the at least one electrical wire hold member includes a slide fixing part which can slide and move along the slide guide.

A fourth aspect is the wire harness support member according to the third aspect, wherein the base includes the plurality of slide guides, and the slide fixing part in the at least one electrical wire hold member can be fixed to one of the plurality of slide guides.

A fifth aspect is the wire harness support member according to the first or second aspect, wherein the base includes a plurality of fixing parts, and the at least one electrical wire hold member includes a hold part-side fixing part which can be fixed to one of the plurality of fixing parts.

A sixth aspect is the wire harness support member according to any one of the first to fifth aspects, wherein the at least one electrical wire hold member includes a plurality of electrical wire hold members.

A support member-attached wire harness according to a seventh aspect includes: the wire harness support member according to any one of the first to sixth aspects; and a wire harness in which at least some of a plurality of electrical wires are held by the at least one electrical wire hold member in the wire harness support member.

An eighth aspect is the support member-attached wire harness according to the seventh aspect, and includes the plurality of wire harness support members, wherein the electrical wire hold members to hold at least some of the plurality of electrical wires are fixed to the base in different positions between the at least two wire harness support members.

A support structure of a support member-attached wire harness according to a ninth aspect includes: the support member-attached wire harness according to the eighth aspect; and a fixing target member to which the plurality of wire harness support members are fixed, wherein the wire harness is disposed along the fixing target member, and a position of an electrical wire hold member to hold at least some the plurality of electrical wires is different in a circumferential direction of the fixing target member between at least two wire harness support members.

Effects of the Invention

According to the first to ninth aspects, at least one electrical wire holding member holding at least some of the plurality of electrical wires can be position-adjustably fixed to the base around the attaching target member. Thus, the wire harness can be supported in a relatively free position on the attaching target member.

According to the second aspect, the electrical wire holding member can hold the plurality of electrical wires for each electrical wire bundle, thus the electrical wire can be easily held.

According to the third aspect, at least one electrical wire holding member slides and moves along the base, thus the position of fixing at least one electrical wire holding member can be set.

According to the fourth aspect, the slide fixing part in at least one electrical wire holding member can be fixed to an optional one of the plurality of slide guides, thus the position of fixing at least one electrical wire holding member can be set.

According to the fifth aspect, the holding part-side fixing part in at least one electrical wire holding member is fixed to an optional one of the plurality of fixing parts in the base, thus the position of fixing at least one electrical wire holding member can be set.

According to the sixth aspect, the plurality of electrical wires can be dispersedly supported by the plurality of electrical wire holding members. Accordingly, the wire harness can be supported around the attaching target member while preventing the wire harness from spreading Brut of the attaching target member as much as possible.

According to the seventh aspect, the wire harness and the wire harness support member are integrated with each other, thus an operation of supporting the wire harness on the attaching target member can be easily performed.

According to the eighth aspect, the electrical wire holding members holding at least some of the plurality of electrical wires are fixed to the base in the different positions between at least two wire harness support members, thus it is easy to correspond to the case where the peripheral components which may interfere with the wire harness are located in the different positions in the plurality of regions in the attaching target member.

According to the ninth aspect, when the peripheral components which may interfere with the wire harness are located in the different positions in the plurality of regions in the attaching target member, the wire harness can be supported to be able to avoid the interference.

DESCRIPTION OF EMBODIMENT(S)

First Embodiment

Figure 1:
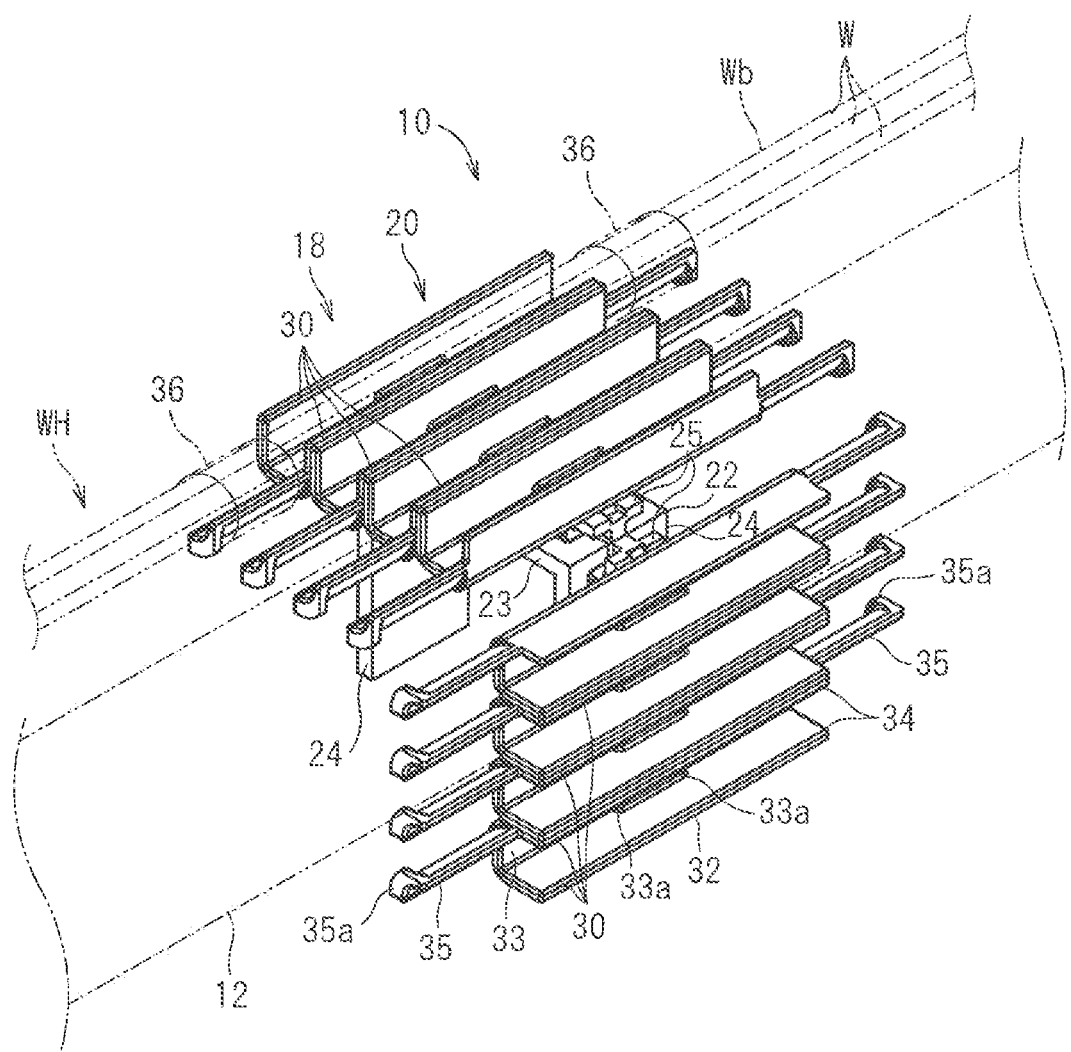
FIG. 1 A schematic perspective view illustrating a support structure of a support member-attached wire harness according to a first embodiment.
Figure 2:
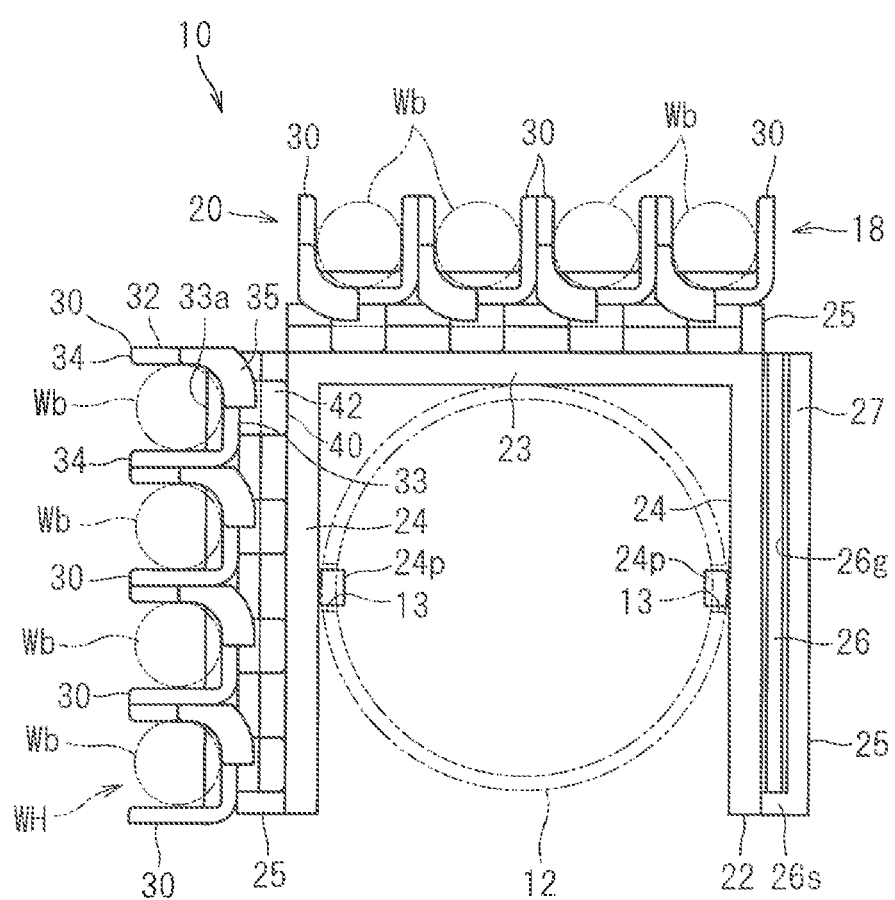
FIG. 2 A schematic front view illustrating the support structure of the support member-attached wire harness.

A wire harness support member, a support member-attached wire harness, and a support structure of the support member-attached wire harness according to a first embodiment are described hereinafter. FIG. 1 is a schematic perspective view illustrating a support structure 10 of a support member-attached wire harness, and FIG. 2 is a schematic front view illustrating the support structure 10 of the support member-attached wire harness.

The support structure 10 of the support member-attached wire harness is a structure for supporting a wire harness support member 20 holding a wire harness WH on an attaching target member 12. That is to say, in a case where the wire harness WH is disposed along the attaching target member 12, the wire harness support member 20 fixed to the attaching target member 12 supports the wire harness WH along the attaching target member 12.

For example, the wire harness WH is assembled into a form in which the wire harness support member 20 is attached, and transported to a vehicle assembly plant. The wire harness support member 20 is fixed to the attaching target member 12 in the vehicle assembly plant. Accordingly, the wire harness WH is supported along the attaching target member 12. It is also applicable that the wire harness WH and the wire harness support member 20 are separately transported to the vehicle assembly plant, and in the vehicle assembly plant, the wire harness support member 20 is attached to the wire harness WH and the wire harness support member 20 is fixed to the attaching target member 12.

The attaching target member 12 described above is assumed to be a reinforcement and a vehicle body frame, for example. The reinforcement is a reinforcement member of a vehicle body, and is normally formed in a rod-like shape. The reinforcement is disposed along a width direction of a vehicle in an installment panel located in front of a driver seat and a front passenger seat in the vehicle, for example. When the wire harness for an electrical device disposed in the installment panel is disposed in the installment panel, the wire harness is disposed along the reinforcement. The support structure 10 of the support member-attached wire harness described above can be applied as a structure of supporting the wire harness along the reinforcement in such a case. Obviously, the support structure 10 of the support member-attached wire harness can also be applied as a structure of supporting the wire harness on the other vehicle body frame such as a portion where an elongated protruding portion is formed on a pact of a metal body, for example.

Described herein is that the attaching target member 12 is a rod-like member, more specifically, a cylindrical member. A fixing hole 13 is formed in the attaching target member 12 to hold the wire harness support member 20 in a predetermined position. Herein, the fixing holes 13 are formed in two positions at both sides of a central axis of the attaching target member 12 in a middle part of the attaching target member 12 in a longitudinal direction. A positioning protruding part 24p described below is fitted into the fixing hole 13, thus the wire harness support member 20 is supported in a predetermined position in an extension direction of the wire harness support member 20 in a state of not getting out of the attaching target member 12.

A support member-attached wire harness 18 includes the wire harness WH and the wire harness support member 20.

The wire harness WH includes a plurality of electrical wires W. The electrical wires W are insulated electrical wires each including a core wire and an insulating covering for covering the core wire. The core wire is made of a conductive material such as copper or aluminum. The core wire may be a single wire or a twisted wire. The insulating covering is formed by extrusion molding, for example, a resin around the core wire.

The plurality of electrical wires W gather around the attaching target member 12 in a portion where the plurality of electrical wires W are disposed along the attaching target member 12. The plurality of electrical wires W may be branched toward outside in a portion where the plurality of electrical wires W extend from an end portion of the attaching target member 12 and a portion where the plurality of electrical wires W are disposed along the attaching target member 12 as necessary. The plurality of electrical wires W may be connected to an electrical device such as an electronic control unit, a load, and a sensor via a connector, for example, at each branch destination.

The plurality of electrical wires W are divided into a plurality of groups in a portion where the plurality of electrical wires W are disposed along the attaching target member 12, and bundled for each divided group (refer to FIG. 2, one electrical wire bundle Wb is illustrated in FIG. 1). Each electrical wire bundle Wb may be grouped for each branch, but is not necessary.

Each electrical wire bundle Wb is separately held in the wire harness support member 20, however, in the other portion, the plurality of electrical wires W included in each electrical wire bundle Wb may be held in one bundle. When the plurality of the wire harness support members 20 are provided, the electrical wire bundle Wb held in each wire harness support member 20 may not be grouped in the similar manner.

Described herein is an example that the plurality of electrical wires W are divided into the eight electrical wire bundles Wb in a portion where the plurality of electrical wires W are supported in the wire harness support member 20.

Figure 3:
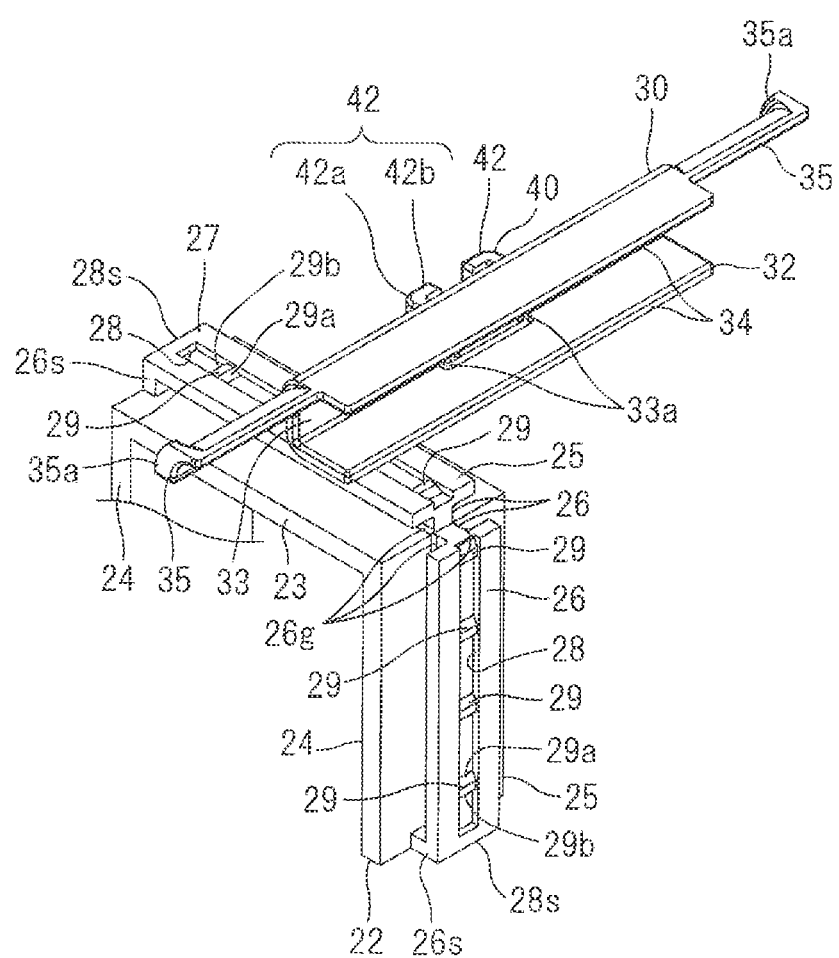
FIG. 3 An exploded perspective view illustrating a wire harness support member.
Figure 4:
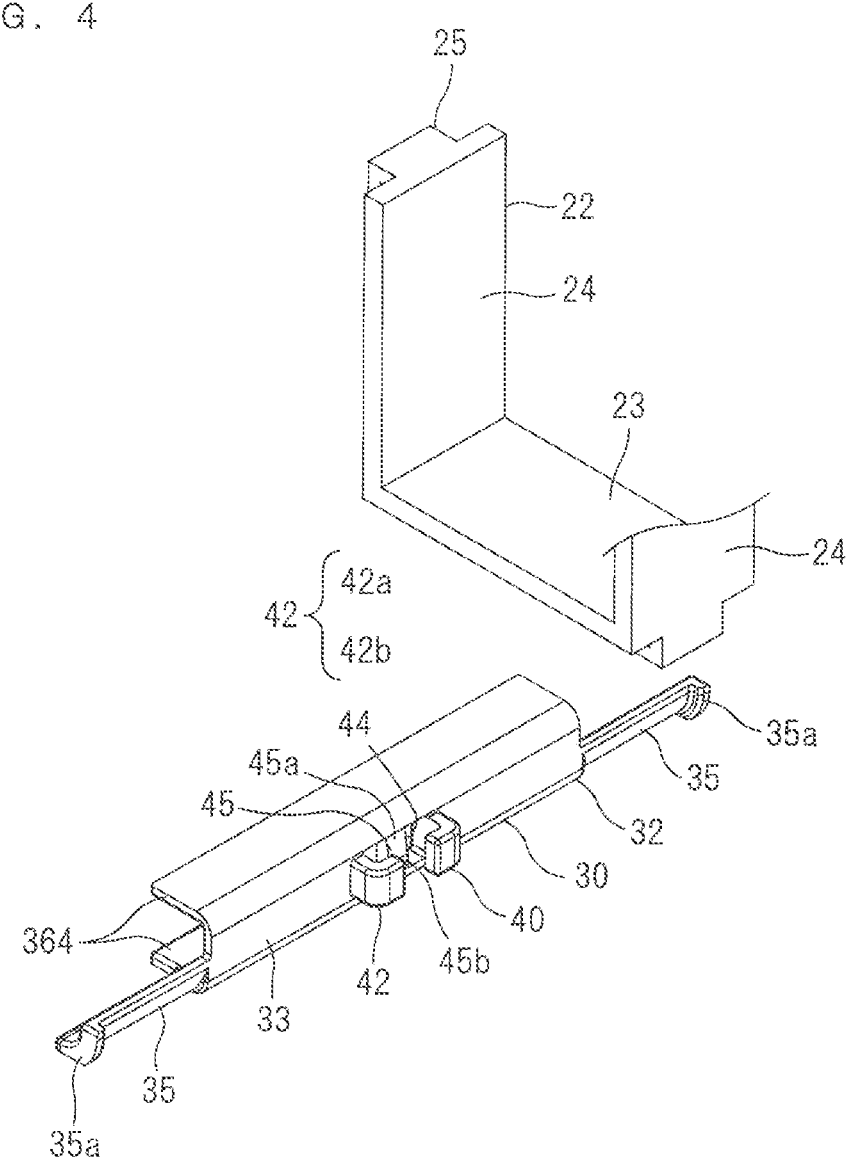
FIG. 4 An exploded perspective view illustrating the wire harness support member.
Figure 5:
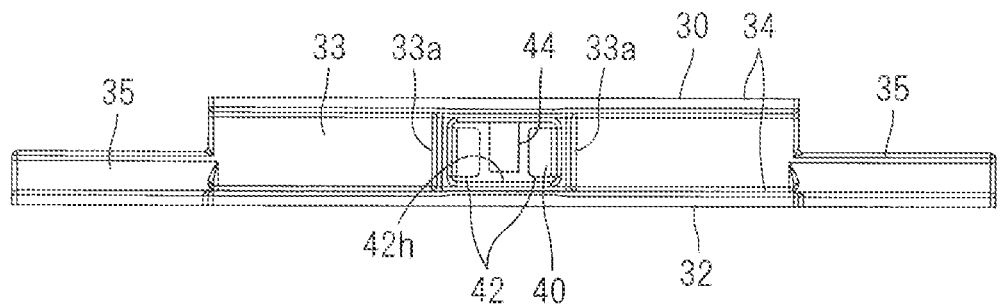
FIG. 5 A plan view illustrating an electrical wire holding member.

FIG. 3 and FIG. 4 are exploded perspective views each illustrating the wire harness support member 20, and FIG. 5 is a plan view illustrating an electrical wire holding member 30.

As illustrated in FIG. 1 to FIG. 5, the wire harness support member 20 supports the plurality of electrical wire bundles Wb in the wire harness WH described above on the attaching target member 12, and includes a base 22 and at least one electrical wire holding member 30.

The base 22 is attached to the attaching target member 12 in a state of covering at least a part of a periphery of the attaching target member 12.

The base 22 has a configuration that a pair of side elongated parts 24 are connected to both end portions of a middle elongated part 23 to extend in the same direction. The base 22 can be a member integrally formed by a resin, for example, distance dimension between the pair of side elongated parts 24 is set to be substantially equal to an outer diameter of the attaching target member 12. A length dimension of the pair of side elongated parts 24 is set to a degree of exceeding half the outer diameter of the attaching target member 12, and is set to substantially equal to a diameter of the attaching target member 12 herein.

The attaching target member 12 can be disposed in a space surrounded by the middle elongated part 23 and the pair of side elongated parts 24 in a posture that extension directions of the middle elongated part 23 and the pair of side elongated parts 24 are orthogonal to an extension direction of the attaching target member 12. In this state, an inward surface of the middle elongated part 23 can have contact with an outer peripheral surface of the attaching target member 12, and inward surfaces of the pair of side elongated parts 24 can have contact with both side portions of the outer peripheral surface of the attaching target member 12.

The positioning protruding part 24p is formed in inward portions of the pair of side elongated parts 24 having contact with the both side portions of the outer peripheral surface of the attaching target member 12 in the state where the inward surface of the middle elongated part 23 has contact with the outer peripheral surface of the attaching target member 12. The positioning protruding part 24p is formed to be able to be fitted into the fixing hole 13 formed in the attaching target member 12.

When the base 22 is attached to the attaching target member 12, the pair of side elongated parts 24 are elastically deformed outward, and the attaching target member 12 is disposed between the pair of side elongated parts 24. Then, when the base 22 is pressed against the attaching target member 12 until the middle elongated part 23 has contact with part of the outer periphery of the attaching target member 12, the pair of positioning protruding parts 24p are fitted into the corresponding pair of fixing holes 13. Subsequently, when the pair of side elongated parts 24 elastically revert to the posture parallel with each other, the state where the pair of positioning protruding parts 24p are fitted into the pair of fixing holes 13 is maintained, and the base 22 is kept to be attached to the attaching target member 12. In this state, the configuration of fitting the pair of positioning protruding parts 24p into the corresponding pair of fixing holes 13 prevents the base 22 from rotating around the attaching target member 12 and deviating in the extension direction of the attaching target member 12.

In this state, the middle elongated part 23 and the pair of side elongated parts 24 surround at least part of the periphery of the attaching target member 12, and herein surround three sides thereof. The base 22 covers at least part of the periphery of the attaching target member 12, thus the electrical wire holding member 30 can be position-adjustably attached to the part of the base 22 covering at least the part of the periphery of the attaching target member 12. Thus, the position of supporting the electrical wires W around the attaching target member 12 can be adjusted.

The structure of attaching the base 22 to the attaching target member 12 is not limited to the example described above. Also applicable is a configuration that a protrusion formed on the base 22 is pressed into a hole formed in a fixing target member, thus the base 22 is attached to the fixing target member. Also applicable is that a tip portion of the base is curved inward, and the portion curved inward prevents the base from getting out of the fixing target member. The base may be fixed to the fixing target member only by a structure of fitting a protrusion for preventing the base from getting out of the fixing target member into a hole formed in the fixing target member.

The base 22 described above includes a slide guide 25 as the electrical wire holding member fixing part for position-adjustably fixing the electrical wire holding member 30. Herein, the slide guide 25 is integrally formed on outward portions of the middle elongated part 23 and the pair of side elongated parts 24 described above. It is not necessary that the slide guide 25 is formed on all the outward portions of the middle elongated part 23 and the pair of side elongated parts 24, however, the slide guide 25 may be integrally formed on only one or two outward portions of the middle elongated part 23 and the pair of side elongated parts 24.

The slide guide 25 is a portion where the electrical wire holding member 30 is position-adjustably fixed. The slide guide 25 is described hereinafter in the relationship with the electrical wire holding member 30.

The electrical wire holding member 30 has a configuration of being position-adjustably fixed to the base 22 around the attaching target member 12 while holding at least part of the plurality of electrical wires W.

The electrical wire holding member 30 includes an electrical wire holding part 32 and a slide fixing part 40. The electrical wire holding member 30 can be a member integrally formed by a resin, for example.

The electrical wire holding part 32 is configured to be able to hold the electrical wire 20. Herein, the electrical wire holding part 32 is configured to be able to hold the electrical wire bundle Wb bundling at least some of the plurality of electrical wires W.

More specifically, the electrical wire holding part 32 includes a bottom part 33 and a pair of sidewall parts 34. The bottom part 33 is formed into an elongated plate-like shape. Each of the pair of sidewall parts 34 is formed into an elongated plate-like shape, and protrudes from both side portions of the bottom part 33 to stand toward one main surface of the bottom 33. The bottom 33 and the pair of sidewall parts 34 form the electrical wire holding part 32 having a gutter shape with both ends and an upper side opened. A distance dimension of the pair of sidewall parts 34 is set to twice as large as the outer diameter of the electrical wire W or more, and the electrical wire bundle Wb in which the plurality of electrical wires W are bundled can be located to be disposed between the pair of sidewall parts 34 on the bottom part 33. A protruding part 33a protrudes from a middle part of the bottom part 33 in an extension direction. Herein, the two protruding parts 33a are formed on the middle part of the bottom part 33 in the extension direction with a space therebetween. More specifically, the protruding part 33a is formed on a pair of edge portions on both outer sides of the electrical wire holding part 32 in the extension direction for a hole 42h described hereinafter. The protruding part 33a is an elongated protrusion along a width direction of the bottom part 33. As described hereinafter, the protruding part 33a has direct contact with the electrical wire bundle Wb in the state where the electrical wire bundle Wb is disposed in the electrical wire holding part 32, thus the deviation of the electrical wire bundle Wb in the electrical wire holding part 32 in the extension direction is suppressed.

A banding extension piece 35 is formed on an end portion (both end portions herein) of the electrical wire holding part 32. The banding extension piece 35 is formed into an elongated shape, and extends from the end portion of the electrical wire holding part 32 toward an outer side along the extension direction of the electrical wire holding part 32. Formed on a tip portion of the banding extension piece 35 is a retaining part 35a protruding to an outer side of an outer peripheral surface of a portion on a near side of the tip portion. Then, the electrical wire bundle Wb is disposed in the electrical wire holding part 32 in a posture along the extension direction of the electrical wire holding part 32. The banding extension piece 35 is disposed along the electrical wire bundle. Wb on the end portion of the electrical wire holding part 32. In this state, a banding member 36 such as an adhesive tape or a banding band is wound around the electrical wire bundle Wh and the banding extension piece 35. Accordingly, the electrical wire bundle Wb is held by the electrical wire holding part 32.

The example of the electrical wire holding part 32 is not limited to the above example. For example, also applicable is a configuration that the electrical wire holding part is formed into a rod-like shape or an elongated plate-like shape, and the electrical wire holding part and the electrical wire W or the electrical wire bundle Wh disposed along the electrical wire holding part are banded by the handing member such as the adhesive tape or the banding band.

The slide fixing part 40 is an example of a fixing part position-adjustably fixed to the base 22, and is configured to be able to slide and move along the slide guide 25 herein.

The slide guide 25 and the slide fixing part 40 are described.

On an outward surface of the middle elongated part 23 or the pair of side elongated parts 24 (an example of being provided on the middle elongated part 23 is mainly described hereinafter), the slide guide 25 is formed into an elongated shape extending along the extension direction of the middle elongated part 23. The slide guide 25 includes a narrow elongated base part 26 extending along the extension direction of the middle elongated part 23 in the middle part in a width direction of the outward surface of the middle elongated part 23 and a wide part 27 protruding from the tip portion of the elongated base part 26 toward both sides of the elongated base part 26 in the width direction and extending along the extension direction of the middle elongated part 23. Thus, side portions of the wide part 27 are disposed in positions located away from the outward surface of the middle elongated part 23 on the both sides of the elongated base part 26, and a pair of side grooves 26g are formed therebetween. The slide guide 25 has substantially a T shape in a horizontal section orthogonal to an extension direction of the slide guide 25.

A groove 28 extending along the extension direction of the middle elongated part 23 is formed in a central part of the outward surface of the wide part 2 in the width direction. The groove 28 and the side groove 26g described above are opened on one end side of the slide guide 25, and are closed on the other end side thereof by stopping parts 28s and 26s. The electrical wire holding member 30 is slidably fitted from one side into the slide guide 25, and comes in contact with the stopping parts 28s and 26s on the other end side of the slide guide 25, thereby being prevented from getting out of the slide guide 25.

In the groove 28 locking protrusions 29 are formed in a plurality of positions with a space therebetween along an extension direction of the groove 28. The plurality of locking protrusions 29 are provided with at equal spaces from the stopping part 28s. One locking protrusion 29 is provided on an opening portion of the groove 28. The electrical wire holding member 30 is position-adjustably fixed in a position between the stopping part 28s and the locking protrusion 29 near the stopping part 28s and each position between the locking protrusions 29. Herein, the four locking protrusions 29 are provided, thus the electrical wire holding member 30 can be position-adjustably fixed in one position between the stopping part 28s and the locking protrusion 29 near the stopping part 28s and three positions between the locking protrusions 29, that is to say, four positions.

The locking protrusion 29 has an inclined surface 29a in which a protrusion dimension gradually decreases toward one side along the extension direction of the middle elongated part 23. A surface of the locking protrusion 29 directed to one side along the extension direction of the middle elongated part 23 forms a surface 29b orthogonal to the extension direction of the middle elongated part 23.

The slide fixing part 40 is formed, in the middle part of the electrical wire holding part 32 in the extension direction.

The slide fixing part 40 includes a pair of guide protruding parts 42 and a locking piece 44.

That is to say, a hole 42h having a rectangular shape is formed in the middle part of the bottom part 33 in the extension direction. The pair of guide protruding parts 42 are formed to be directed to an outer side of the bottom part 33 from an outside of the hole 42h formed in the bottom part 33 in the extension direction of the electrical wire holding part 32. The guide protruding part 42 includes a guide base part 42a directed from an outward surface of the bottom part 33 toward outside and a guide end part 42b protruding from the tip portion of the guide base part 42a toward the guide base part 42a located on an opposite side. When the electrical wire holding part 32 is observed from a lateral side, each of the pair of guide protruding parts 42 has an L shape whose tip portion is directed to the other one of the pair thereof. A distance dimension between the pair of guide base parts 42a is set to be substantially equal to a width dimension of the wide part 27, and the wide part 27 can be slidably disposed between the pair of guide base parts 42a. A distance from the outward surface of the bottom part 33 to the inward surface of the guide end part 42b is set to be substantially equal to a thickness dimension of the wide part 27, and the both side portions of the wide part 27 can be disposed to slide and move between the outward surface of the bottom part 33 and the inward surface of the guide end part 42b. A thickness dimension of the guide end part 42b is set to be substantially equal to a width dimension of the side groove 26g, and the guide end part 42b can be disposed to slide and move in the side groove 26g.

The pair of guide end parts 42b are fitted into the pair of side grooves 26g from one end portion of the slide guide 25 and the both side portions of the wide part 27 is fitted between the outward surface of the bottom part 33 and the inward surface of the guide end part 42b, thus the slide fixing part 40 can be set to slide and move along the slide guide 25.

The locking piece 44 is configured to be able to be locked to the locking protrusion 29 described above. More specifically, the locking piece 44 extends from an edge of one side of the electrical wire holding part 32 in the width direction in the hole 42h in the bottom part 33 toward an edge of the other side. The locking piece 44 is connected to the edge of one side of the electrical wire holding part 32 in the width direction in the hole 42h in the bottom part 33, and is separated from the bottom part 33 on the other three sides. Accordingly, the locking piece 44 can be elastically deformed in an inward-outward direction of the bottom part 33 by being bent at a base end portion thereof.

A stopping protruding part 45 protrudes on the outward surface of the locking piece 44. The stopping protruding part 45 has an inclined surface 45a in which a protrusion dimension gradually increases from one side of the electrical wire holding part 32 in the width direction toward the other side. A surface of the stopping protruding part 45 directed to the other side of the electrical wire holding part 32 in the width direction forms a surface 45b orthogonal to the width direction of the electrical wire holding part 32. The stopping protruding part 45 protrudes to more outer side than the outward surface of the bottom part 33. The stopping protruding part 45 is disposed in the groove 28, and protrudes in the groove 28 so as to be able to be locked to the locking protrusion 29 in a state where the slide fixing part 40 is set on the slide guide 25.

When the slide fixing part 40 is set on the slide guide 25, the stopping protruding part 45 comes in contact with the locking protrusion 29 near the opening of the groove 28. Then, the inclined surface 45a of the stopping protruding part 45 and the inclined surface 29a of the locking protrusion 29 come in contact with each other. When the slide fixing part 40 is further pressed against the slide guide 25, the inclined surface 45a is pressed on the inclined surface 29a, and the locking piece 44 is elastically deformed to an inner side of the bottom part 33. When the slide fixing part 40 is pressed until the stopping protruding part 45 passes over the locking protrusion 29, the locking piece 44 elastically reverts to an original shape, and the surface 45h of the stopping protruding part 45 and the surface 29b of the locking protrusion 29 faces each other and enter a state of being able to have in contact with each other. Accordingly, the stopping protruding part 45 is disposed between the locking protrusion 29 located closest to the opening of the slide guide 25 and the locking protrusion 29 adjacent to the locking protrusion 29 closest to the opening, in this position, the electrical wire holding member 30 is supported on the slide guide 25.

When the slide fixing part 40 is further pressed against the slide guide 25, the stopping protruding part 45 passes over the next locking protrusion 29 in the manner similar to the above description, and is positioned and held between the next locking protrusion 29 and the subsequent locking protrusion 29. Accordingly, the slide fixing part 40 can be positioned and held in an optional position between the adjacent the stopping protruding parts 45 on the slide guide 25. When the slide fixing part 40 is pressed farthest against the slide guide 25, the electrical wire holding member 30 can be positioned and held on the slide guide 25 in a state where the stopping protruding part 45 is located between the farthest locking protrusion 29 and the stopping part 28s.

In this manner, the electrical wire holding member 30 can be position-adjustably held on each slide guide 25. The plurality of slide guides 25 are provided on the base 22 described above, and the electrical wire holding member 30 can be fixed to one of the plurality of slide guides 25, thus it is possible to make each of the plurality of slide guides 25 hold or not hold the electrical wire holding member 30. FIG. 1 and FIG. 2 illustrate that the slide guide 25 formed on the middle elongated part 23 holds the plurality of (four herein) electrical wire holding members 30, the slide guide 25 formed on one side elongated part 24 holds the plurality of (four herein) electrical wire holding members 30, and the slide guide 25 formed on the other side elongated part 24 does not hold the electrical wire holding member 30.

Described is an example of holding the electrical wire holding member 30 using the wire harness support member 20. Assuming that the support member-attached wire harness 18 is attached to the attaching target member 12, the example can conform to a form of an empty space around the support member-attached wire harness 18.

Figure 6:
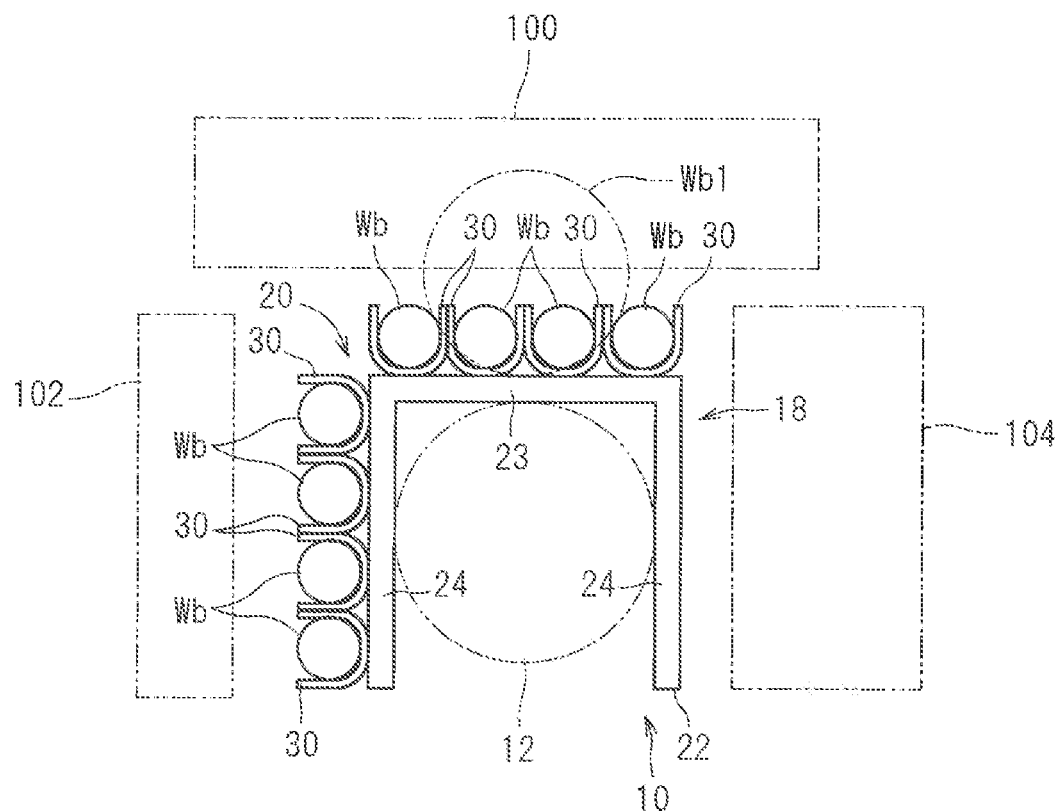
FIG. 6 An explanation drawing illustrating an example of a holding position of the electrical wire holding member on a base.

Herein assumed is a case where peripheral components 100, 102, and 104 are located on an upper side and both lateral sides of the attaching target member 12 in a vehicle, for example, as illustrated in FIG. 6. Assumed as the peripheral components 100, 102, and 104 are an interior panel (such as a dash panel) of a vehicle, an electrical device, and a duct component for an air conditioner, for example. There is some degree of empty space between the attaching target member 12 and the peripheral component 100 on the upper side and between the attaching target member 12 and the peripheral component 102 on one lateral side, and there is a relatively small space between the attaching target member 12 and the peripheral component 104 on the other lateral side.

In this case, when all of the electrical wires W are bundled together, the electrical wires W are formed into a relatively thick bundle as an electrical wire bundle Wb1 illustrated in FIG. 6. Thus, it is hard to place the electrical wire bundle in any space around the attaching target member 12.

The electrical wires W are divided into a plurality of groups, and bundled for each group to form a plurality of (eight herein) electrical wire bundles Wb. Then, each electrical wire bundle Wb is separately held by the electrical wire holding member 30. The plurality of (four herein) electrical wire holding members 30 are held by the slide guide 25 in the middle elongated part 23, and the electrical wire holding member 30 is not held by the slide guide 25 in one side elongated part 24.

Accordingly, the plurality of electrical wires W can be dispersedly held on the attaching target member 12. The electrical wire bundle Wb is not disposed in a position with a small empty space around the attaching target member 12, and the electrical wire W is disposed in a position with a large empty space, thus the empty space around the attaching target member 12 can be effectively used, and the plurality of electrical wire bundles Wb can be disposed along the attaching target member 12.

Figure 7:
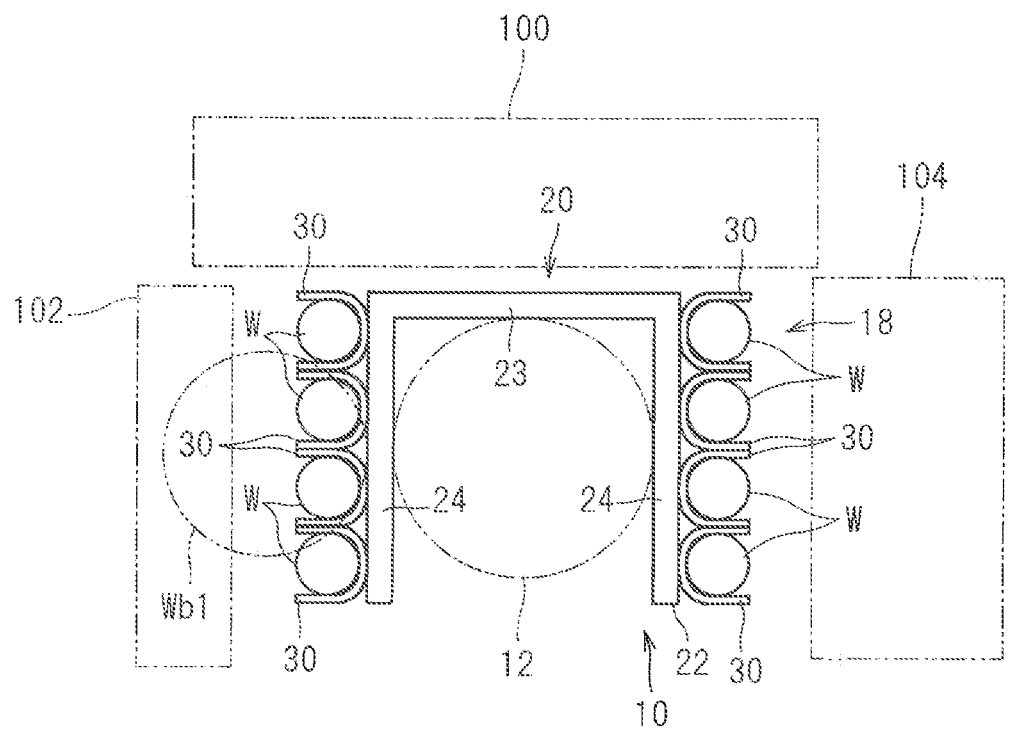
FIG. 7 An explanation drawing illustrating another example of the holding position of the electrical wire holding member on the base.

For example, as illustrated in FIG. 7, there is some degree of empty space between the attaching target member 12 and the peripheral components 102 and 104 on the both sides, and there is a relatively small space between the attaching target member 12 and the peripheral component 100 on the upper side.

In this case, when all of the electrical wires W are bundled together, the electrical wires W are formed into a relatively thick bundle as an electrical wire bundle Wb1 as illustrated in FIG. 7. Thus, it is hard to place the electrical wire bundle Wb1 in any space around the attaching target member 12.

The electrical wires W are divided into a plurality of groups, and bundled for each group to form a plurality of (eight herein) electrical wire bundles Wb. The plurality of (four herein) electrical wire holding members 30 are held by the slide guides 25 in the pair of side elongated parts 24, and the electrical wire holding member 30 is not held by the slide guide 25 in the middle elongated part 23.

Accordingly, the plurality of electrical wires W can be dispersedly held on the attaching target member 12. The electrical wire bundle Wb is not disposed in a position with a small empty space around the attaching target member 12, and the electrical wire W is disposed in a position with a large empty space, thus the empty space around the attaching target member 12 can be effectively used, and the plurality of electrical wire bundles Wb can be disposed along the attaching target member 12.

When some degree of empty space is ensured on the upper side and both sides of the attaching target member 12, the plurality of (four herein) electrical wire holding members 30 may be held by each of the slide guides 25 in the middle elongated part 23 and pair of side elongated parts 24. Also in this case, the empty space on the upper side and both sides of the attaching target member 12 can be effectively used compared to the case of bundling all of the electrical wires W together.

Figure 8:
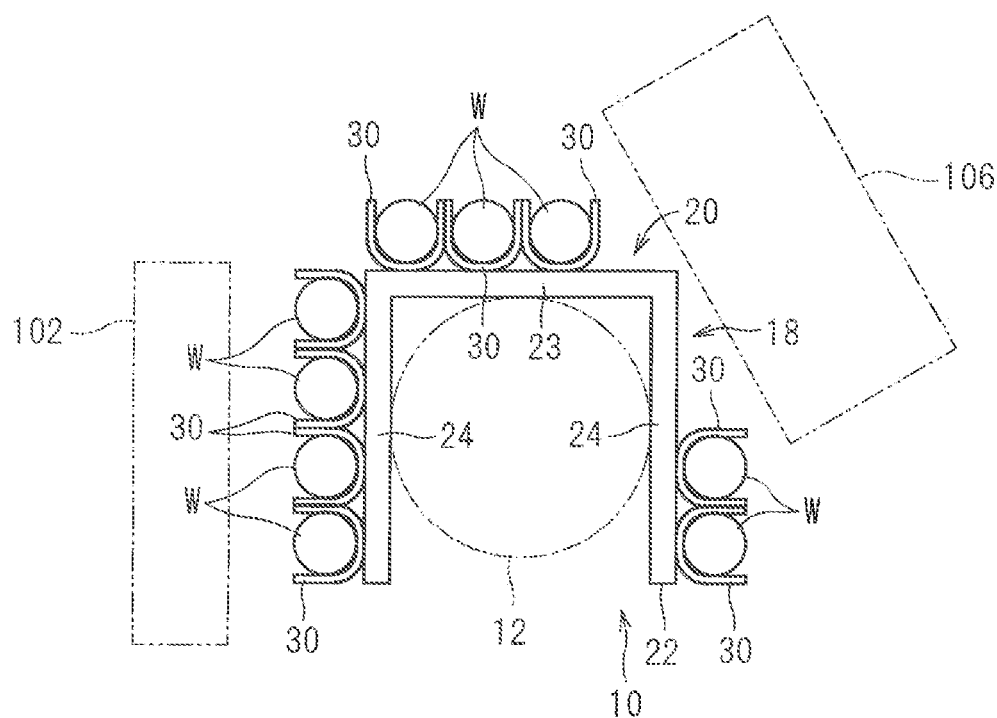
FIG. 8 An explanation drawing illustrating still another example of the holding position of the electrical wire holding member on the base.

Also considered is a case where a peripheral component 106 is closely disposed on an obliquely upper side of the attaching target member 12 as illustrated in FIG. 8. In this case, an empty space on the upper side of the attaching target member 12 close to the other side is reduced, and an empty space on the other side of the attaching target member 12 close to the upper side is reduced.

In such a case, at least one (two herein) electrical wire holding member 30 is held in a position close to a lower side of the slide guide 25 in the other side elongated part 24, and at least one (three herein) electrical wire holding member 30 is held in a position close to one side of the slide guide 25 in the middle elongated part 23. The electrical wire holding member 30 is held by the slide guide 25 on one side elongated part 24 within a range where the electrical wire bundle Wb can be disposed in accordance with the empty space.

Accordingly, the plurality of electrical wire bundles Wb can be disposed along the attaching target member 12 using the empty space in accordance with the empty space around the attaching target member 12.

Described above is the example that the middle elongated part 23 is located on the upper side of the attaching target member 12, however, the middle elongated part 23 may be located on a lateral side or lower side of the attaching target member 12.

Figure 9:
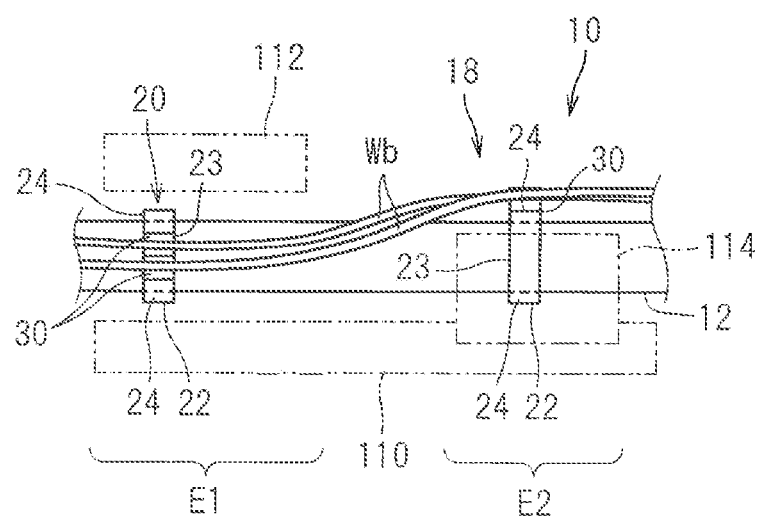
FIG. 9 An explanation drawing illustrating still another example of the holding position of the electrical wire holding member on the base.

The position of the empty space does not necessarily stay constant in the extension direction of the attaching target member 12. For example, as illustrated in FIG. 9, there is a case where peripheral components 110 and 112 are closely disposed on the both sides of the attaching target member 12 in a first region E1 in the extension direction of the attaching target member 12, and the peripheral component 110 is closely disposed on one side of the attaching target member 12 and a peripheral component 114 is closely disposed on the upper side of the attaching target member 12 in a second region E2. FIG. 9 illustrates an example of seeing the attaching target member 12 from the upper side. In this case, an empty space where the electrical wire W (the electrical wire bundle Wb) can be disposed is ensured on the upper side of the attaching target member 12 in the first region E1, and an empty space where the electrical wire W (the electrical wire bundle Wb) can be disposed is ensured on one lateral side of the attaching target member 12 in the second region E2.

Thus, in the first region E1, the electrical wire W (the electrical wire bundle Wb) is held in the middle elongated part 23 on the upper side in the wire harness support member 20. In the second region E2, the electrical wire W (the electrical wire bundle Wb) is held in the side elongated part 24 on one lateral side in the wire harness support member 20. That is to say, the electrical wire holding members 30 holding the plurality of electrical wires W (the electrical wire bundles Wb) are fixed to the base 22 in different positions in the circumferential direction of the attaching target member 12 between at least two wire harness support members 20.

Accordingly, when the position of the empty space does not stay constant in the extension direction of the attaching target member 12, for example, the empty space around the attaching target member 12 can be effectively used in accordance with the position of the empty space, and the plurality of the electrical wire bundles Wb can be disposed along the attaching target member 12.

As described above, according to the present embodiment, at least one electrical wire holding member 30 holding the electrical wire W (the electrical wire bundle Wb) can be position-adjustably fixed to the base 22 around the attaching target member 12. Herein, the electrical wire holding member 30 can be position-adjustably fixed to the base 22 by setting the fixation or non-fixation of the electrical wire holding member 30 to the plurality of slide guides 25 described above and adjusting a position of holding the electrical wire holding member 30 on the slide guide 25. Thus, the wire harness WH can be supported in a relatively free position on the attaching target member 12 in consideration of the empty space around the attaching target member 12, for example.

Accordingly, even when the number of electrical control units (ECUs) increases in accordance with a computerization of a vehicle and the number of electrical wires thereby increases, the larger number of electrical wires can be easily routed around the electrical wire holding member 30. Even when the space for routing the wire harness is reduced in accordance with a design or an increase in the other functional component (for example, a noise reduction material), the remaining space can be effectively used to easily route the wire harness.

It is preferable to prepare the support member-attached wire harness 18 in which the electrical wire holding member 30 is held in a predetermined position on the base 22 in consideration of the empty space before the base 22 is fixed to the attaching target member 12, for example. Accordingly, the position adjustment of the electrical wire bundle Wb and the electrical wire holding member 30 needs not be performed after fixing the wire harness support, member 20 to the attaching target member 12. However, it is also applicable to move the electrical wire holding member 30 along the slide guide 25 after fixing the wire harness support member 20 to the attaching target member 12, thereby performing the position adjustment of the electrical wire holding member 30 and the electrical wire bundle Wh.

The electrical wire holding member 30 holds the electrical wire bundle Wh made up of the plurality of electrical wires W bundled together, thus can hold the plurality of electrical wires for each electrical wire bundle Wb. Accordingly, the electrical wire W can be easily held compared to the case of separately holding the electrical wire W.

An outer diameter of each electrical wire bundle Wb held by the plurality of electrical wire holding members 30 needs not be the same as each other. For example, a relatively thick electrical wire bundle Wb may be adopted as the electrical wire bundle Wb disposed in a position with a relatively large empty space on the attaching target member 12, and a relatively thin electrical wire bundle Wb may be adopted as the electrical wire bundle Wb disposed in a position with a relatively small empty space.

The electrical wire holding member 30 can be slid on the slide guide 25 and position-adjusted, thus the position of fixing the electrical wire holding member 30 can be set by the slide movement.

The configuration of supporting the electrical wire holding member 30 in the predetermined position in the slide guide 25 is not limited to the example described above. For example, also applicable is a configuration that grooves or protruded strips orthogonal to the extension direction of the slide guide are sequentially formed in the slide guide, and protruded strips or grooves which can be locked to the groove or the protruded strips are formed in the slide fixing part, thus the slide fixing part is positioned on the slide guide in the positions in more stages.

The plurality of slide guides 25 can be considered as the plurality of fixing parts, and the slide fixing part 40 in the electrical wire holding member 30 can be considered as a holding part-side fixing part which can be fixed to one of the plurality of slide guides. In this case, the position of fixing the electrical wire holding member 30 can be set by fixing the electrical wire holding member 30 to an optional slide guide 25 of the plurality of slide guides 25.

The plurality of electrical wire holding members 30 are provided, thus the plurality of electrical wires W can be dispersedly held by the plurality of electrical wire holding members 30. Accordingly, the wire harness WH can be dispersedly supported around the attaching target member 12 while preventing the wire harness WH from spreading out of the attaching target member 12 as much as possible.

Prepared is the wire harness WH attached to the wire harness support member 20 and integrated therewith, thus an operation of supporting the wire harness WH on the attaching target member 12 can be easily performed.

The electrical wire holding members 30 holding the plurality of electrical wires W (the electrical wire bundles Wb) are fixed to the base 22 in the different positions in the circumferential direction of the attaching target member 12 between at least two wire harness support members 20, thus even when the peripheral components which may interfere with the wire harness WH are located in the different positions in the plurality of regions E1 and E2 in the attaching target member 12, the wire harness WH can be disposed along the attaching target member 12 using the empty space effectively while easily corresponding to the condition of the arrangement.

Second Embodiment

Figure 10:
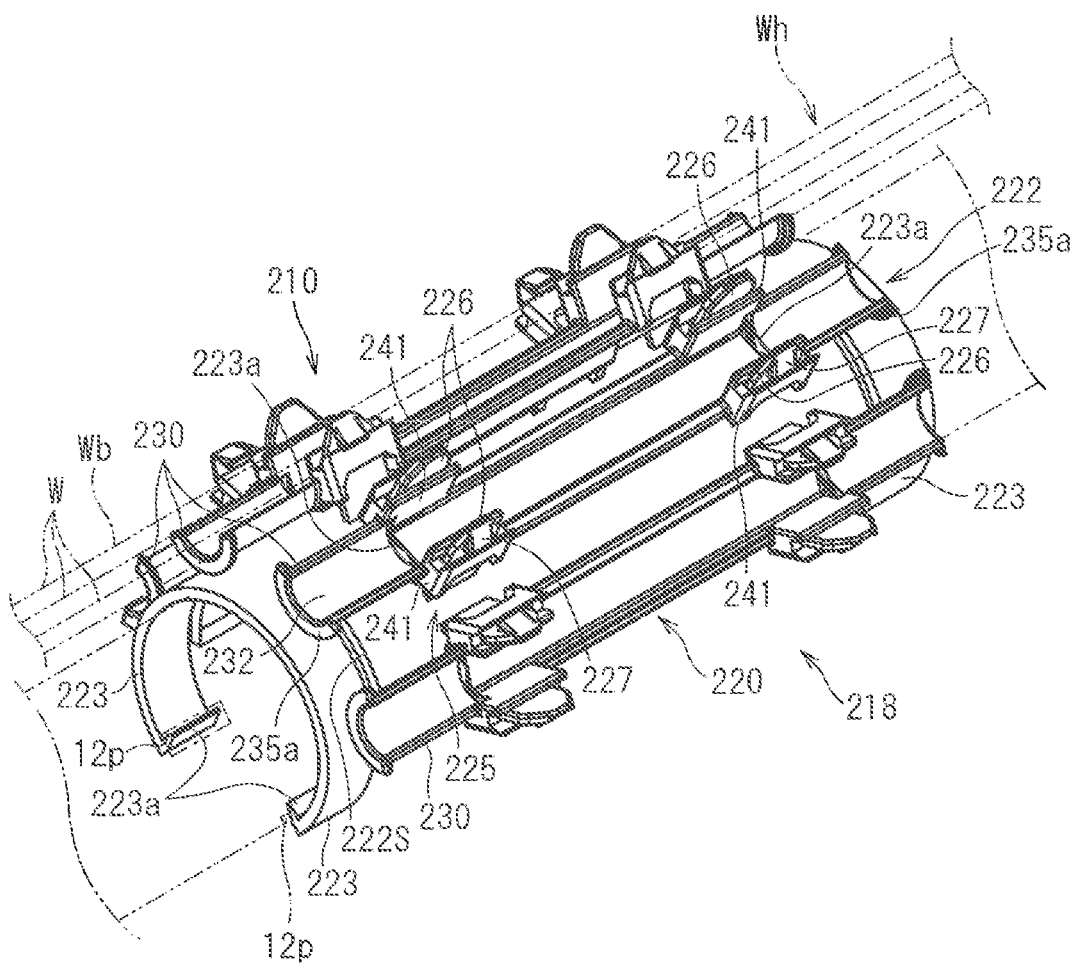
FIG. 10 A schematic perspective view illustrating a support structure of a support member-attached wire harness according to a second embodiment.
Figure 11:
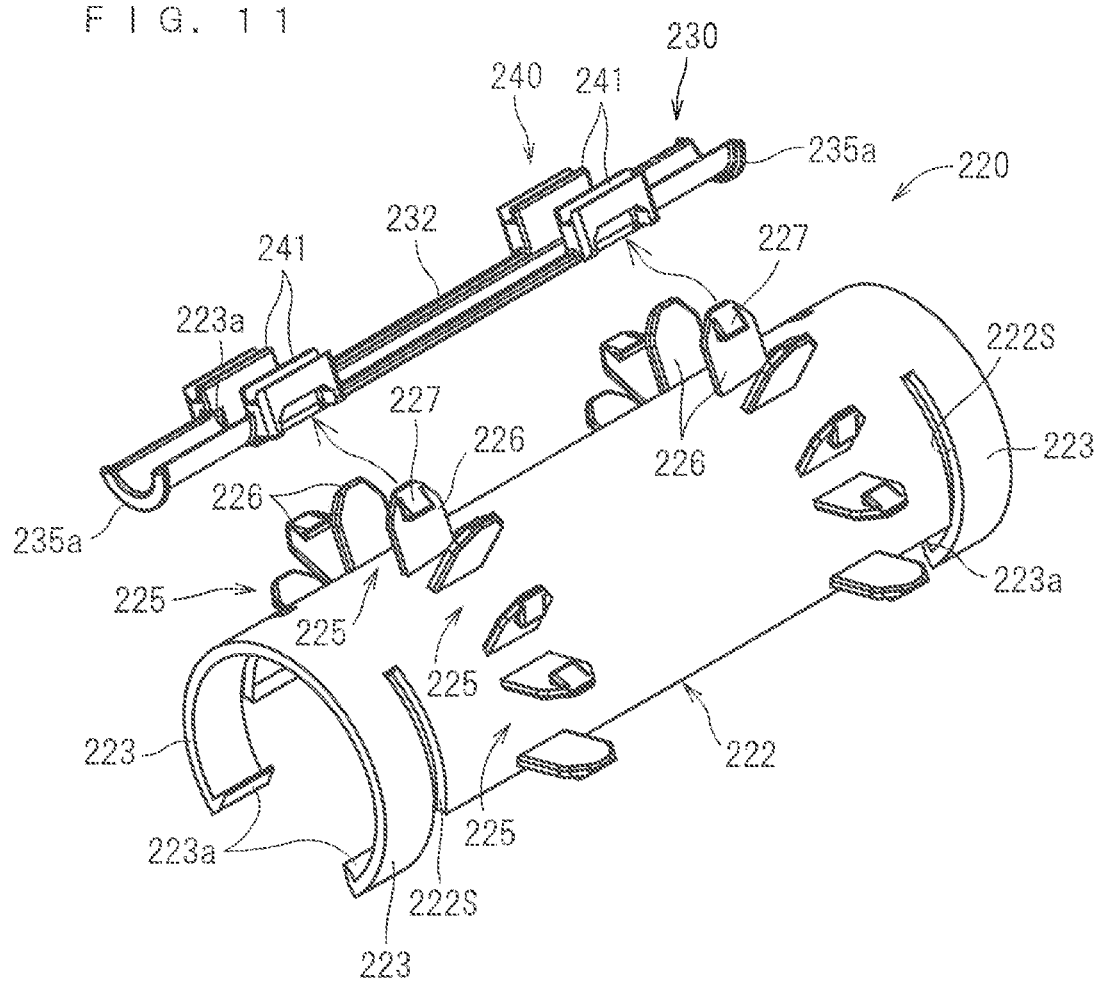
FIG. 11 An exploded perspective view illustrating a wire harness support member.

A wire harness support member, a support member-attached wire harness, and a support structure of the support member-attached wire harness according to a second embodiment are described hereinafter. FIG. 10 is a schematic perspective view illustrating a support structure 210 of a support member-attached wire harness, and FIG. 11 is an exploded perspective view illustrating a wire harness support member 220. In the following description of the present embodiment, the same reference numerals are assigned to the similar constituent elements described in the first embodiment, and the description thereof will be omitted.

The support structure 210 of the support member-attached wire harness is a structure for supporting a support member-attached wire harness 218 on the attaching target member 12. The support member-attached wire harness 218 includes the wire harness WH and the wire harness support member 220.

The wire harness support member 220 includes a base 222 and an electrical wire holding part 230.

The base 222 is attached to the attaching target member 12 in a state of covering at least a part of a periphery of the attaching target member 12.

The base 222 is formed into a partially-cylindrical shape constituting a part of a cylinder. The base 222 is a partial cylinder exceeding a half cylinder. The base 22 can be a member integrally formed by a resin, for example. A curvature radius of an inner periphery surface of the base 222 coincides with a curvature radius of an outer peripheral surface of the attaching target member 12.

Both sides of both end portions in an extension direction of the base 222 are separated via a slit 222S in a circumferential direction with respect to a middle part in the extension direction of the base 222. Accordingly, a pair of elastic deformation pieces 223 at the both sides of the both end portions in the extension direction of the base 222 can be elastically deformed in an inward-outward direction of the base 222.

Locking claws 223a protruding inward are formed on tip portions of the pair of elastic deformation pieces 3 provided on the both end portions of the base 222. Holes 12p to which the pair of locking claws 223a are fitted are formed in parts of the attaching target member 12 corresponding to the pair of locking claws 223a.

When the base 222 is set on the attaching target member 12 to cover the periphery of the attaching target member 12, the pair of elastic deformation pieces 223 of the both end portions of the base 222 are elastically deformed outward, and when each locking claw 223a is fitted into the hole 12p, each elastic deformation piece 223 reverts to the original shape. Accordingly, each locking claw 223a is kept in a state of being fitted into the hole 12p, thus the base 222 is kept in a state of being fixed to the attaching target member 12. In this state, the configuration of fitting the locking claws 223a into the corresponding pair of holes 12p prevents the base 222 from rotating around the attaching target member 12 and deviating in the extension direction of the attaching target member 12.

The structure of attaching the base 222 to the attaching target member 12 is not limited to the example described above. For example, also applicable is a configuration that the locking claw 223a described above is omitted, and the base formed into a partial cylinder exceeding a half cylinder covers more than the half of the periphery of the attaching target member, thus the base is kept in a state of not getting out of the attaching target member. Also applicable in this case is that at least one protruding part is formed on an inner peripheral part of the base and fitted into a hole formed in the attaching target member 12 to suppress the deviation of the base. Also applicable is a configuration that a protrusion formed on the base is pressed into a hole firmed in the fixing target member, thus the base is attached to the fixing target member. The base may be fixed to the fixing target member only by a structure of fitting a protrusion for preventing the base from getting out of the fixing target member into a hole formed in the fixing target member. Also applicable is a configuration that the base is formed into a cylinder shape covering a whole periphery of the attaching target member and a hinge part enabling an opening and closing of the base is provided halfway through the base in the circumferential direction. Also applicable in this case is a configuration that a locking part and a locked part mutually locked are provided on tip portions of two parts connecting via the hinge part, and the locking part and the locked part are locked to each other in a state where the base is attached to the periphery of the attaching target member so that the base is attached to the attaching target member. Also applicable in this case is that at least one protruding part is formed on an inner peripheral part of the base and fitted into a hole formed in the attaching target member 12 to suppress the deviation of the base.

The base 222 covers at least part of the attaching target member 12 in the circumferential direction. Thus, a plurality of fixing parts 225 for fixing an electrical wire holding member 230 can be provided on the base 222 to be dispersed in the circumferential direction of the attaching target member 12. The electrical wire holding member 230 can be fixed to an optional one of the plurality of fixing parts 225, thus the positions of holding the electrical wire holding member 230 and the electrical wire W (the electrical wire bundle Wb) can be adjusted. The fixing part 225 is described hereinafter in the relationship with the electrical wire holding member 230.

The electrical wire holding member 230 has a configuration of being position-adjustably fixed to the base 222 around the attaching target member 12 while holding at least part of the plurality of electrical wires W.

The electrical wire holding member 230 includes an electrical wire holding part 232 and a holding part-side fixing part 240. The electrical wire holding member 230 can be a member integrally formed by a resin, for example.

The electrical wire holding part 232 is configured to be able to hold the electrical wire W. Herein, the electrical wire holding part 232 is configured to be able to hold the electrical wire bundle Wb bundling at least some of the plurality of electrical wires W.

More specifically, the electrical wire holding part 232 is formed into a partially-cylindrical shape. A curvature radius of an inner periphery surface of the electrical wire bolding part 232 is set to be equal to or larger than a curvature radius of an outer periphery of the electrical wire bundle Wb to be held, thus the electrical wire bundle Wb can be disposed in the electrical wire holding part 232. A protruding part 233a protrudes along a circumferential direction of the electrical wire holding part 232 on an inner periphery in a middle part of the electrical wire holding part 232 in an extension direction. Herein, the two protruding parts 233a are formed on the middle part of the electrical wire holding part 232 in the extension direction with a space therebetween. As described hereinafter, the protruding part 233a has direct contact with the electrical wire bundle Wb in the state where the electrical wire bundle Wh is disposed in the electrical wire holding part 232, thus the deviation of the electrical wire bundle Wb in the electrical wire holding part 232 in the extension direction is suppressed.

A retaining part 235a protruding toward an outer peripheral side is formed on an end portion (both end portions herein) of the electrical wire holding part 232. Then, the electrical wire bundle Wb is disposed in the electrical wire holding part 232 in a posture along the extension direction of the electrical wire holding part 232. In this state, a banding member such as an adhesive tape or a banding band is wound around end portions of the electrical wire holding part 232 and the electrical wire bundle Wb. Accordingly, the electrical wire bundle Wb is held by the electrical wire holding part 232.

The plurality of fixing parts 225 are provided on an outer peripheral part of the electrical wire holding part 232 along the circumferential direction thereof, and the electrical wire holding member 230 can be fixed to an optional one of the plurality of fixing parts 225.

The plurality of (four herein) fixing parts 225 are formed to be dispersed into a plurality of parts (four herein) along the circumferential direction of the outer peripheral part of the electrical wire holding part 232.

Each fixing part 225 includes a plurality of (four herein) fixing pieces 226. The four fixing pieces 226 are provided in pairs in positions close to both ends of the base 222, respectively. The pair of fixing pieces 226 are provided with a distance dimension therebetween in the circumferential direction of the base 222 so that the electrical wire holding part 232 described above can be disposed. Each fixing piece 226 is formed into a plate-like piece protruding outward from the outer peripheral surface of the base 222. A tip portion of each fixing piece 226 is formed into a shape gradually narrowing toward a tip portion side. A locking protruding part 227 is formed on one main surface of the tip portion of each fixing piece 226. The locking protruding part 227 is formed into a shape in which a protruding dimension gradually increases from the tip portion toward a base end portion of the fixing piece 226. A surface of the locking protruding part 227 facing a base end side of the fixing piece 226 forms a surface orthogonal to the protrusion direction of the fixing piece 226.

The holding part-side fixing part 240 is a portion provided on the electrical wire holding part 232 and fixed to the holding part 225 described above. Herein, the holding part-side fixing part 240 includes a plurality of (four herein) holding part-side fixation receiving part 241 provided around the electrical wire holding part 232. Herein, the pair of holding part-side fixation receiving part 241 are provided on both side portions of two positions close to the both ends of the electrical wire holding part 232. The holding part-side fixation receiving part 241 is formed into a flat square tube-like shape in which a through hole which can pass through the fixing piece 226 described above is formed. The holding part-side fixation receiving part 241 is integrally formed on a lateral side of the electrical wire holding part 232 in a posture that a passing-through direction of the through hole is arranged along the thickness direction of the middle part of the electrical wire holding part 32 in the width direction.

The plurality of fixing pieces 226 constituting the fixing part 225 are inserted into the through holes of the plurality of holding part-side fixation receiving part 241 constituting each holding part-side fixing part 240, respectively, in a state where one of the plurality of fixing parts 225 provided on the base 222 is applied to the fixing part 225 to be attached. When the electrical wire holding part 232 is pressed toward the base 222 until the locking protruding part 227 passes over the through hole, the locking protruding part 227 is locked to the peripheral edge part of the holding part-side fixation receiving part 241 in a state of not getting out of the holding part-side fixation receiving part 241. The plurality of fixing pieces 226 are locked in the state of not getting out of the holding part-side fixation receiving part 241 in the similar manner, thus the electrical wire holding member 230 is fixed to the fixing part 225 on the outer periphery of the base 222.

In the description of the example described above, the plurality of fixing pieces 226 are provided on the base 222, and the plurality of holding part-side fixation receiving part 241 are provided on the electrical wire holding member 230, however, also applicable is a configuration that one fixing piece is provided on the base side, and one holding part-side fixation receiving part is provided on the electrical wire holding member side. The example of the fixing piece inserted into and held by the holding part-side fixation receiving part in a state of not getting out of the holding part-side fixation receiving part is limited to the example described above, but various kinds of retaining configuration can be adopted. In the example described above, the fixing piece 226 on the base 222 side is inserted into the holding part-side fixation receiving part 241 on the electrical wire holding member 230 side, however, in contrast, also applicable is that a fixation receiving part having a hole on a base side is provided and a fixing piece inserted into the fixation receiving part is provided on the electrical wire holding member side.

Figure 12:
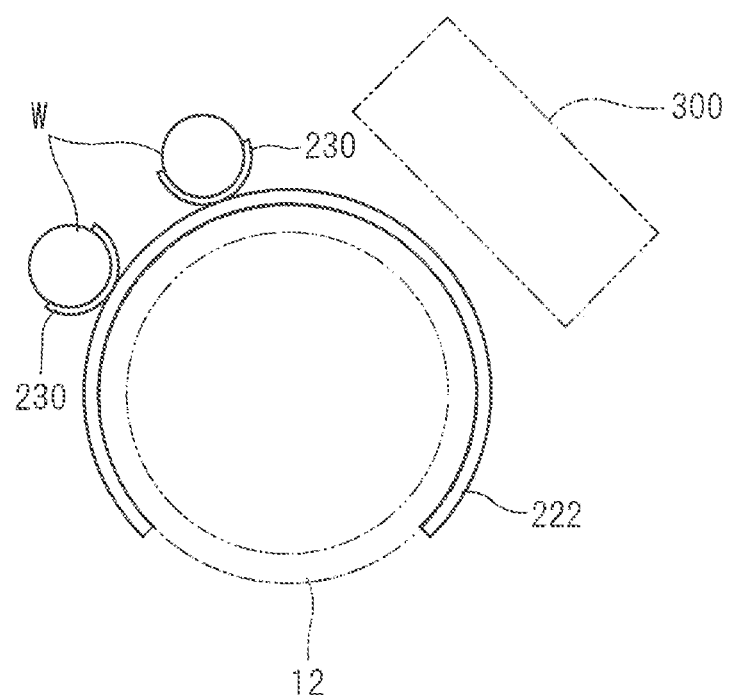
FIG. 12 An explanation drawing illustrating an example of a holding position of an electrical wire holding member on a base.

Also according to the present second embodiment, the electrical wire holding member 230 can be fixed to an optional one of the plurality of fixing parts 225. Thus, at least one electrical wire holding member 230 holding the electrical wire W (the electrical wire bundle Wb) can be position-adjustably fixed to the base 222 around the attaching target member 12. Thus, the wire harness WH can be supported in a relatively free position on the attaching target member 12 in consideration of the empty space around the attaching target member 12, for example. For example, as illustrated in FIG. 12, in a case where a peripheral component 300 is located on an obliquely upper side of the attaching target member 12, the electrical wire holding member 230 can be fixed to some of (two on the left side in FIG. 12) the fixing parts 225 close to one side of the base 222 in the plurality of fixing parts 225 so as to be located away from the peripheral component 300. When the empty space is sufficiently ensured around the whole attaching target member 12, the electrical wire holding member 230 may be fixed to all of the plurality of fixing parts 225.

The plurality of electrical wires W (the electrical wire bundle Wb) are dispersedly held by the plurality of electrical wire holding members 230 around the attaching target member 12, thus the wire harness WH can be held along the attaching target member 12 so as to prevent an excess protrusion of the electrical wire W from the attaching target member 12.

In this manner, according to the present second embodiment, a function effect similar to that of the first embodiment described above can be obtained except for a function effect by the slide guide 25 and the slide fixing part 40.

MODIFICATION EXAMPLE

Each configuration described in the above embodiments and modification examples thereof can be appropriately combined as long as they are not contradictory.

For example, the base 22 in the first embodiment may have a shape similar to that of the base 222 in the second embodiment. In this case, the slide guide is formed along the circumferential direction of the outer peripheral surface of the base constituting a part of a cylinder.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10, 210 support structure of support member-attached wire harness
12 attaching target member
18, 218 support member-attached wire harness
20, 220 wire harness support member
22, 222 base
25 slide guide
26g side groove
28 groove
29 locking protrusion
30, 230 electrical wire holding member
32, 232 electrical wire holding member
40 slide fixing part
42 guide protruding part
44 locking piece
225 fixing part
226 fixing piece
240 holding part-side fixing part
241 holding part-side fixation receiving part
W electrical wire
WH wire harness
Wb electrical wire bundle

The invention claimed is:
1. A wire harness support member for supporting a wire harness including a plurality of electrical wires on an attaching target member, the wire harness support member comprising:
a base configured to be attached to the attaching target member while surrounding at least a part of a periphery of the attaching target member, and
the base including two slide guides; and
electrical wire holders configured to be position-adjustably fixed, via the two slide guides, to the base around the attaching target member while holding at least some of the plurality of electrical wires,
each of the electrical wire holders includes a corresponding slide fixing part which is configured to slide and move along a respective one of the two slide guides,
and an extension piece having a rod-like shape or an elongated plate-like shape, the extension piece protruding from both end portions of each of the electrical wire holders along a longitudinal axis of the electrical wire holders, and the extension piece configured to wound an adhesive tape or a banding band around the respective electrical wire of the plurality of the electrical wires, wherein each of the two slide guides is configured to slidably mount at least two of the electrical wire holders via the corresponding slide fixing part, a longitudinal axis of one of the two slides guides is oriented perpendicular with respect to a longitudinal axis of the other of the two slides guides, and the two slide guides are respectively provided on adjacent side surfaces of the base.

2. The wire harness support member according to claim 1, wherein at least one of the electrical wire holders includes an electrical wire bundle hold part to hold an electrical wire bundle that is a bundle of electrical wires from among the plurality of electrical wires.

3. The wire harness support member according to claim 1, wherein the two slide guides are among a plurality of slide guides.

4. A support member-attached wire harness, comprising:

at least one wire harness support member according to claim 1, and the wire harness that includes the plurality of electrical wires.

5. The support member-attached wire harness according to claim 4, wherein the at least one wire harness support member is a plurality of wire harness support members, wherein each of the electrical wire holders is configured to hold respective electrical wires among the plurality of electrical wires at different positions on a corresponding base of the wire harness support members.

6. A support structure of a support member-attached wire harness, comprising:

the support member-attached wire harness according to claim 5; and the attaching target member to which the plurality of wire harness support members are fixed, wherein the wire harness is disposed along the attaching target member, and a position of at least one of the electrical wire holders is such that the respective electrical wires among the plurality of electrical wires are held in a different position in the circumferential direction of the attaching target member on which the corresponding base of the wire harness support members is fixed.

* * * * *